US011735767B2

(12) United States Patent
Park et al.

(10) Patent No.: US 11,735,767 B2
(45) Date of Patent: Aug. 22, 2023

(54) COMPOSITION FOR GEL POLYMER ELECTROLYTE AND LITHIUM SECONDARY BATTERY INCLUDING GEL POLYMER ELECTROLYTE FORMED THEREFROM

(71) Applicant: LG CHEM, LTD., Seoul (KR)

(72) Inventors: Sol Ji Park, Daejeon (KR); Kyoung Ho Ahn, Daejeon (KR); Chul Haeng Lee, Daejeon (KR); Min Jung Kim, Daejeon (KR); Jae Won Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 627 days.

(21) Appl. No.: 16/967,636

(22) PCT Filed: Sep. 20, 2019

(86) PCT No.: PCT/KR2019/012251
§ 371 (c)(1),
(2) Date: Aug. 5, 2020

(87) PCT Pub. No.: WO2020/060295
PCT Pub. Date: Mar. 26, 2020

(65) Prior Publication Data
US 2021/0257659 A1  Aug. 19, 2021

(30) Foreign Application Priority Data

Sep. 21, 2018 (KR) .................. 10-2018-0114102

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0082* (2013.01); *H01M 2300/0085* (2013.01)

(58) Field of Classification Search
CPC ......... H01M 10/0565; H01M 10/0525; H01M 2300/0082; H01M 2300/0085; H01M 10/052; H01M 10/4235; H01M 10/52; Y02E 60/10; Y02P 70/50
USPC .......................................................... 429/303
See application file for complete search history.

(56) References Cited

U.S. PATENT DOCUMENTS

| 10,243,239 | B1 | 3/2019 | Ahn et al. | |
|---|---|---|---|---|
| 10,950,895 | B2* | 3/2021 | Oh | H01M 4/134 |
| 2014/0272600 | A1 | 9/2014 | Bouchet et al. | |
| 2017/0229735 | A1 | 8/2017 | Ahn et al. | |
| 2017/0373347 | A1 | 12/2017 | Lee et al. | |
| 2018/0342767 | A1 | 11/2018 | Ahn et al. | |
| 2018/0355113 | A1 | 12/2018 | Takimoto et al. | |
| 2019/0267660 | A1 | 8/2019 | Lee et al. | |
| 2020/0220212 | A1* | 7/2020 | Ahn | H01M 10/0565 |

FOREIGN PATENT DOCUMENTS

| CN | 103874724 A | 6/2014 |
|---|---|---|
| CN | 106797048 A | 5/2017 |
| CN | 107078342 A | 8/2017 |
| CN | 107546412 A | 1/2018 |
| CN | 108352569 A | 7/2018 |
| CN | 108431131 A | 8/2018 |
| EP | 3203565 A1 | 8/2017 |
| JP | H08-295715 A | 11/1996 |
| JP | 2014-529863 A | 11/2014 |
| JP | 2017-535919 A | 11/2017 |
| KR | 10-0229599 B1 | 11/1999 |
| KR | 10-2014-0061501 A | 5/2014 |
| KR | 10-2016-0040127 A | 4/2016 |
| KR | 10-2016-0040128 A | 4/2016 |
| KR | 10-2018-0026358 A | 3/2018 |
| KR | 10-2018-0083273 A | 7/2018 |

OTHER PUBLICATIONS

Porcarelli et al., "Single-ion triblock copolymer electrolytes based on poly(ethylene oxide) and methacrylic sulfonamide blocks for lithium metal batteries," Journal of Power Sources, 2017, vol. 364, pp. 191-199.

Shaplov et al., "Design and synthesis of new anionic 'polymeric ionic liquids' with high charge delocalization," Polymer Chemistry, 2011, 2, pp. 2609-2618.

Porcarelli et al., "Single-Ion Block Copoly(ionic liquid)s as Electrolytes for All-Solid State Lithium Batteries," ACS Applied Materials & Interfaces, 2016, 8, pp. 10350-10359.

(Continued)

*Primary Examiner* — Gary D Harris

(74) *Attorney, Agent, or Firm* — Morgan, Lewis & Bockius LLP

(57) ABSTRACT

The present invention relates to a composition for a gel polymer electrolyte and a lithium secondary battery including a gel polymer electrolyte formed therefrom, and particularly, to a composition for a gel polymer electrolyte, which includes a lithium salt, an organic solvent, an oligomer represented by Formula 1 and having a polymerizable substituent, a compound represented by Formula 2 and having a crosslinking reactive group, and a polymerization initiator, and a lithium secondary battery including a gel polymer electrolyte prepared by polymerization of the composition.

12 Claims, No Drawings

(56) References Cited

OTHER PUBLICATIONS

International Search Report (with partial translation) and Written Opinion issued in corresponding International Patent Application No. PCT/KR2019/012251, dated Dec. 30, 2019.
Extended European Search Report dated Feb. 9, 2021 issued by the European Patent Office in corresponding European patent application No. 19862130.2.
Meziane et al., "Single-ion polymer electrolytes based on a delocalized polyanion for lithium batteries," Electrochimica Acta, vol. 57, 2011, pp. 14-19, XP028124235.

\* cited by examiner

COMPOSITION FOR GEL POLYMER ELECTROLYTE AND LITHIUM SECONDARY BATTERY INCLUDING GEL POLYMER ELECTROLYTE FORMED THEREFROM

CROSS-REFERENCE TO RELATED APPLICATIONS

This application claims the benefit of Korean Patent Application No. 2018-0114102, filed on Sep. 21, 2018, in the Korean Intellectual Property Office, the disclosure of which is incorporated herein in its entirety by reference.

TECHNICAL FIELD

The present invention relates to a composition for a gel polymer electrolyte and a lithium secondary battery including a gel polymer electrolyte formed therefrom.

BACKGROUND ART

Recently, there is a growing demand for high performance, high stability secondary batteries as electric, electronic, communication, and computer industries have rapidly developed. Particularly, in line with miniaturization and lightweight trends of electronic and communication devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

The lithium ion battery is advantageous in that it has high capacity, but the lithium ion battery is disadvantageous in that, since the liquid electrolyte containing a lithium salt is used, there is a risk of leakage and explosion and battery design is complicated to prepare for the risk.

In contrast, with respect to the lithium polymer battery, since a solid polymer electrolyte or a gel polymer electrolyte containing a liquid electrolyte solution is used as the electrolyte, stability is improved and, simultaneously, flexibility is obtained, and thus, the lithium polymer battery may be developed in various forms, for example, in the form of small or thin-film batteries.

A secondary battery, in which the gel polymer electrolyte is used, may be prepared by the following two methods.

First, after an electrolyte composition is prepared by mixing an oligomer or monomer polymerizable with a polymerization initiator in a liquid electrolyte solution in which a lithium salt is dissolved in a non-aqueous organic solvent, the electrolyte composition is injected into a battery accommodating an electrode assembly, and gelation (crosslinking) is performed under appropriate temperature and time conditions to prepare the secondary battery.

However, with respect to the above method, since wetting in a cell is poor due to high viscosity and surface tension problem of the solution before the injection, it is disadvantageous in that mechanical strength is not easily secured even after the gelation.

As another method, after one surface of one of an electrode and a separator is coated with the electrolyte composition and curing (gelation) is performed by using heat or ultraviolet (UV) light to form a gel polymer electrolyte, an electrode assembly is prepared by winding or stacking the electrode and/or the separator on which the gel polymer electrolyte is formed, the electrode assembly is inserted into a battery case, and the secondary battery may then be prepared by reinjecting a conventional liquid electrolyte solution thereinto.

However, this method requires a heat or UV irradiation process for gelation and has a limitation in that the gel-coated separator absorbs moisture to degrade performance and stability of the battery. Furthermore, since a polyethylene separator, which has been used as a conventional separator, has a high thermal contraction coefficient, a short circuit occurs between the positive electrode and the negative electrode when used under an abnormal condition where the temperature rises, and thus, the stability of the battery may be reduced.

Therefore, there is a need to develop a method which may secure mechanical strength and ion transfer capability and may simultaneously prepare a gel polymer electrolyte having improved stability at high temperature.

PRIOR ART DOCUMENT

Korean Patent Application Laid-open Publication No. 2018-0026358

DISCLOSURE OF THE INVENTION

Technical Problem

An aspect of the present invention provides a composition for a gel polymer electrolyte which includes a polymerizable oligomer having a polymerizable substituent and an ionic monomer having a crosslinking reactive group.

Another aspect of the present invention provides a gel polymer electrolyte which is formed by thermal polymerization of the composition for a gel polymer electrolyte to improve mechanical strength and electrochemical stability.

Another aspect of the present invention provides a lithium secondary battery in which the electrochemical stability is improved by including the gel polymer electrolyte.

Technical Solution

According to an aspect of the present invention, there is provided a composition for a gel polymer electrolyte which includes:

a lithium salt, an organic solvent, an oligomer represented by Formula 1 below, a compound represented by Formula 2 below, and a polymerization initiator.

[Formula 1]

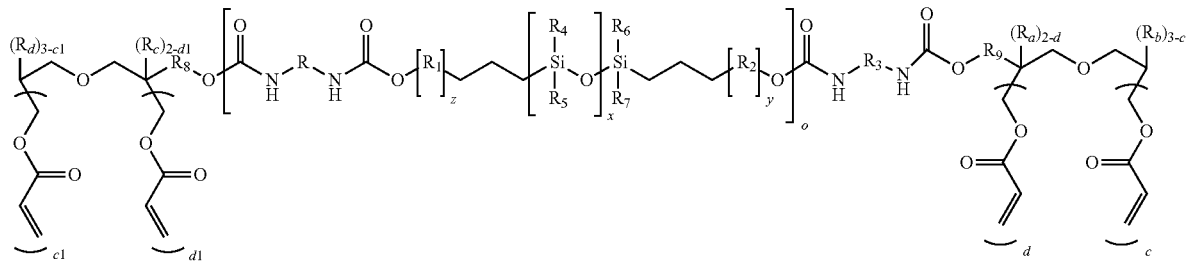

In Formula 1, $R_1$ is an alkylene group having 1 to 5 carbon atoms or —$R_1'$—O—, wherein $R_1'$ is an alkylene group having 1 to 5 carbon atoms, $R_2$ is an alkylene group having 1 to 5 carbon atoms or —O—$R_2'$—, wherein $R_2'$ is an alkylene group having 1 to 5 carbon atoms, $R_4$, $R_5$, $R_6$, and $R_7$ are each independently hydrogen or an alkyl group having 1 to 3 carbon atoms, R and $R_3$ are each independently an aliphatic hydrocarbon group or an aromatic hydrocarbon group, each of $R_8$ and $R_9$ is an alkylene group having 1 to 5 carbon atoms, $R_a$, $R_b$, $R_c$, and $R_d$ are each independently hydrogen or an alkyl group having 1 to 3 carbon atoms, x, y, z, and o are each independently an integer of 1 to 100, c and c1 are each independently an integer of 1 to 3, and d and d1 are each independently an integer of 0 to 2.

[Formula 2]

$$H_2C=C\begin{matrix}R_{10}\\ |\\ \end{matrix}\text{—C(=O)—O—}R_{11}\text{—A}^{\ominus}\text{M}^{\oplus}$$

In Formula 2, $R_{10}$ is hydrogen or an alkyl group having 1 to 4 carbon atoms, $R_{11}$ is an alkylene group having 1 to 6 carbon atoms which is unsubstituted or substituted with fluorine, and M is at least one alkali metal ion selected from lithium (Li), sodium (Na), and potassium (K), and A is $SO_3^{\ominus}$, $$SO_2C(CN)_2^{\ominus} \text{ or } SO_2NSO_2CF_3^{\ominus}.$$

According to another aspect of the present invention, there is provided a gel polymer electrolyte formed by thermal polymerization of the composition for a gel polymer electrolyte of the present invention.

According to another aspect of the present invention, there is provided a lithium secondary battery including the gel polymer electrolyte of the present invention.

Advantageous Effects

Since an oligomer represented by Formula 1, which is included in a composition for a gel polymer electrolyte of the present invention, contains a siloxane group and a urethane group, as a hydrophobic part, as well as an acrylate group, as a hydrophilic part, in its structure to act as a surfactant in a battery, the oligomer represented by Formula 1 may improve wetting of the composition for a gel polymer electrolyte. Also, a compound represented by Formula 2, which is included in the composition for a gel polymer electrolyte of the present invention, has an effect of improving crosslinking and an effect of improving ion transfer capability of the gel polymer electrolyte by including a double bond, as a crosslinking reactive group, and an alkali metal ion in its structure. Thus, if the composition for a gel polymer electrolyte of the present invention, which includes both the oligomer represented by Formula 1 and the compound represented by Formula 2, is used, a lithium secondary battery including a gel polymer electrolyte having improved mechanical properties and electrochemical stability may be achieved.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Before describing the present invention, the expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, —$CH_2$—, —$CH_2CH_2$—, —$CH_2CH_2CH_2$—, —$CH_2(CH_2)CH$—, —$CH(CH_2)CH_2$—, and —$CH(CH_2)CH_2CH_2$—.

Also, in the present specification, the expression "alkylene group" denotes a branched or unbranched divalent unsaturated hydrocarbon group. In an embodiment, the alkylene group may be substituted or unsubstituted. The alkylene group includes a methylene group, an ethylene group, a propylene group, an isopropylene group, a butylene group, an isobutylene group, a tert-butylene group, a pentylene group, and 3-pentylene group, but the alkylene group is not limited thereto, and each thereof may be selectively substituted in another exemplary embodiment.

Furthermore, unless otherwise defined in the specification, the expression "substitution" denotes that at least one hydrogen bonded to carbon is substituted with an element other than hydrogen, for example, an alkyl group having 1 to 5 carbon atoms or a fluorine element.

Also, it will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Unless otherwise defined in the specification, the expression "molecular weight" denotes a weight-average molecular weight (Mw), and the weight-average molecular weight (Mw) of a polymer or oligomer of the present invention may be measured using gel permeation chromatography (GPC) unless otherwise specified.

Electrochemical (oxidation) stability in the present specification was measured using linear sweep voltammetry (LSV). A potentiostat (EG&G, model 270A) was used as a measurement instrument, and measurement temperature was 60° C.

Tensile strength in the present specification was measured for electrolyte specimens, which were collectively prepared according to ASTM standard D638 (Type V specimens), at a rate of 5 mm per minute at 25° C. and a relative humidity of about 30% using Lloyd LR-10K.

Ionic conductivity in the present specification may be measured by using an alternating current impedance method. Specifically, the ionic conductivity may be measured in a frequency range of 0.1 Hz to 100 MHz using a VMP3 measurement instrument and a precision impedance analyzer (4294A).

Composition for Gel Polymer Electrolyte

A composition for a gel polymer electrolyte according to the present invention includes:

a lithium salt,
an organic solvent,
an oligomer represented by Formula 1 below,
a compound represented by Formula 2 below, and
a polymerization initiator.

each of $R_8$ and $R_9$ is an alkylene group having 1 to 5 carbon atoms, $R_a$, $R_b$, $R_c$, and $R_d$ are each independently hydrogen or an alkyl group having 1 to 3 carbon atoms, x, y, z, and o are each independently an integer of 1 to 100, c and c1 are each independently an integer of 1 to 3, and d and d1 are each independently an integer of 0 to 2.

[Formula 2]

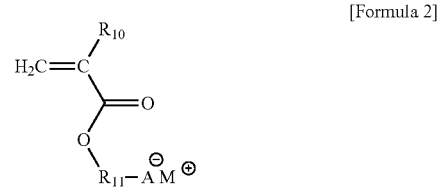

In Formula 2, $R_{10}$ is hydrogen or an alkyl group having 1 to 4 carbon atoms, $R_{11}$ is an alkylene group having 1 to 6 carbon atoms which is unsubstituted or substituted with fluorine, and M is at least one alkali metal ion selected from lithium (Li), sodium (Na), and potassium (K), and A is $SO_3^\ominus$,

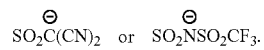

(1) Lithium Salt

Various lithium salts typically used in an electrolyte for a lithium secondary battery may be used as the lithium salt without limitation. For example, the lithium salt may include $Li^+$ as a cation, and may include one selected from the group consisting of $F^-$, $Cl^-$, $Br^-$, $I^-$, $NO_3^-$, $N(CN)_2^-$, $ClO_4^-$, $BF_4^-$, $B_{10}Cl_{10}^-$, $AlO_4^-$, $AlCl_4^-$, $PF_6^-$, $CF_3SO_3^-$, $CH_3CO_2^-$, $CH_3SO_3^-$, $CF_3CO_2^-$, $AsF_6^-$, $SbF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $(FSO_2)_2N^-$, $(CF_3SO_2)_2N^-$, $CF_3CF_2(CF_3)_2CO^-$, $(CF_3SO_2)_2CH^-$, $(SF_5)_3C^-$,

[Formula 1]

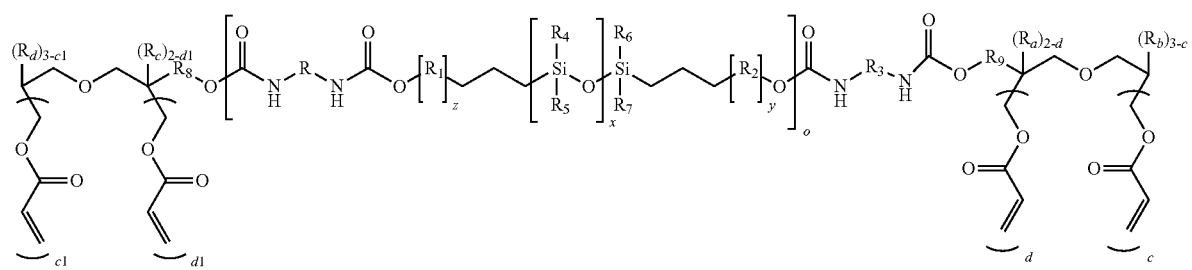

In Formula 1, $R_1$ is an alkylene group having 1 to 5 carbon atoms or $-R_1'-O-$, wherein $R_1'$ is an alkylene group having 1 to 5 carbon atoms, $R_2$ is an alkylene group having 1 to 5 carbon atoms or $-O-R_2'-$, wherein $R_2'$ is an alkylene group having 1 to 5 carbon atoms, $R_4$, $R_5$, $R_6$, and $R_7$ are each independently hydrogen or an alkyl group having 1 to 3 carbon atoms, R and $R_3$ are each independently an aliphatic hydrocarbon group or an aromatic hydrocarbon group, $(CF_3SO_2)_3C^-$, $CF_3(CF_2)_7SO_3^-$, $SCN^-$, and $(CF_3CF_2SO_2)_2N^-$ as an anion, and, in addition thereto, a lithium salt typically used in an electrolyte solution of a lithium secondary battery may be used without limitation.

Specifically, the lithium salt may include a single material selected from the group consisting of LiCl, LiBr, LiI, $LiClO_4$, $LiBF_4$, $LiB_{10}Cl_{10}$, $LiAlO_4$, $LiAlCl_4$, $LiPF_6$, $LiCF_3SO_3$, $LiCH_3CO_2$, $LiCH_3SO_3$, $LiCF_3CO_2$, $LiAsF_6$, $LiSbF_6$, lithium bis(fluorosulfonyl)imide (LiFSI, $LiN(SO_2F)_2$), lithium bisperfluoroethanesulfonimide (LiBETI, $LiN(SO_2CF_2CF_3)_2$) and lithium (bis)trifluoromethanesulfonimide (LiTFSI, LiN(SO$_2$CF$_3$)$_2$) or a mixture of two or more thereof, and, more specifically, the lithium salt may include at least one of LiPF$_6$, LiFSI, and LiTFSI.

The lithium salt may be appropriately changed in a normally usable range, but may be included in a concentration of 1.0 M to 6.0 M, for example, 1.5 M to 4.0 M in the composition for a gel polymer electrolyte to obtain an optimum effect of forming a film for preventing corrosion of a surface of the electrode.

In a case in which the concentration of the lithium salt satisfies the above range, lithium cation (Lit) transfer characteristics (that is, cation transference number) may be improved due to an increase in lithium cations present in the composition for a gel polymer electrolyte, and an effect of reducing resistance during lithium ion diffusion may be achieved to improve cycle capacity characteristics.

That is, the composition for a gel polymer electrolyte may provide ionic conductivity and may simultaneously reduce resistance due to depletion of lithium ion during high rate charge and discharge by including 1.0 M or more of the lithium salt. If the concentration of the lithium salt is 1.0 M or less, cycle life characteristics and capacity characteristics of a lithium secondary battery may be degraded. Also, if the maximum concentration of the lithium salt is greater than 6.0 M, since viscosity of the composition for a gel polymer electrolyte is excessively increased to degrade wetting properties of the electrolyte, overall performance of the secondary battery may be degraded.

In a case in which the concentration of the lithium salt is 4 M or more, the viscosity of the electrolyte may be increased, but, since a portion of the oligomer included in the composition for a gel polymer electrolyte reduces surface tension while acting as a surfactant as described later, a reduction in wetting of the composition for a gel polymer electrolyte may be prevented.

(2) Organic Solvent

The organic solvent is not limited as long as it may minimize decomposition due to an oxidation reaction during charge and discharge of the secondary battery and may exhibit desired characteristics with an additive The organic solvent may include a cyclic carbonate-based organic solvent, a linear carbonate-based organic solvent, or a mixed organic solvent thereof.

The cyclic carbonate-based organic solvent is an organic solvent capable of well dissociating the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include ethylene carbonate.

Also, the linear carbonate-based organic solvent is an organic solvent with low viscosity and low permittivity, wherein, as a representative example thereof, at least one organic solvent selected from the group consisting of dimethyl carbonate (DMC), diethyl carbonate (DEC), dipropyl carbonate, ethylmethyl carbonate (EMC), methylpropyl carbonate, and ethylpropyl carbonate may be used, and the linear carbonate-based organic solvent may specifically include ethylmethyl carbonate (EMC).

In order to prepare an electrolyte solution having high ionic conductivity, it is desirable to use a mixed organic solvent of the cyclic carbonate-based organic solvent and the linear carbonate-based organic solvent as the organic solvent.

Furthermore, the organic solvent may further include a linear ester-based organic solvent and/or a cyclic ester-based organic solvent in addition to the cyclic carbonate-based organic solvent and/or the linear carbonate-based organic solvent.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

An organic solvent typically used in an electrolyte solution for a lithium secondary battery may be further used as the organic solvent without limitation, if necessary. For example, at least one organic solvent of an ether-based organic solvent, a glyme-based organic solvent, and a nitrile-based organic solvent may be further included.

As the ether-based solvent, any one selected from the group consisting of dimethyl ether, diethyl ether, dipropyl ether, methyl ethyl ether, methyl propyl ether, ethyl propyl ether, 1,3-dioxolane (DOL), and 2,2-bis(trifluoromethyl)-1, 3-dioxolane (TFDOL) or a mixture of two or more thereof may be used, but the ether-based solvent is not limited thereto.

The glyme-based solvent is a solvent having higher dielectric constant, lower surface tension, and lower reactivity with metal than the linear carbonate-based organic solvent, wherein the glyme-based solvent may include at least one selected from the group consisting of dimethoxyethane (glyme, DME), diglyme, triglyme, and tetraglyme.

The nitrile-based solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

(3) Oligomer

The composition for a gel polymer electrolyte of the present invention is a compound having a crosslinkable substituent which may form a polymer matrix, a basic skeleton of the gel polymer electrolyte, while being oxidized by polymerization when the temperature rises, wherein it includes an oligomer represented by the following Formula 1 which contains at least one acrylate group at its end.

[Formula 1]

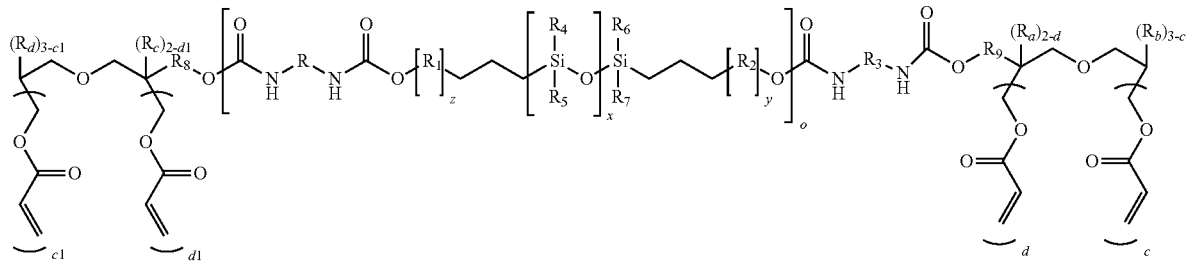

In Formula 1, $R_1$ is an alkylene group having 1 to 5 carbon atoms or —$R_1'$—O—, wherein is an alkylene group having 1 to 5 carbon atoms, $R_2$ is an alkylene group having 1 to 5 carbon atoms or —O—$R_2'$—, wherein $R_2'$ is an alkylene group having 1 to 5 carbon atoms, $R_4$, $R_5$, $R_6$, and $R_7$ are each independently hydrogen or an alkyl group having 1 to 3 carbon atoms, R and $R_3$ are each independently an aliphatic hydrocarbon group or an aromatic hydrocarbon group, each of $R_8$ and $R_9$ is an alkylene group having 1 to 5 carbon atoms, $R_a$, $R_b$, $R_c$, and $R_d$ are each independently hydrogen or an alkyl group having 1 to 3 carbon atoms, x, y, z, and o are each independently an integer of 1 to 100, c and c1 are each independently an integer of 1 to 3, and d and d1 are each independently an integer of 0 to 2.

Specifically, in Formula 1, $R_1$ may be —$R_1'$—O—, wherein $R_1'$ is an alkylene group having 1 to 5 carbon atoms, $R_2$ may be —O—$R_2'$—, wherein $R_2'$ is an alkylene group having 1 to 5 carbon atoms, $R_4$, $R_5$, $R_6$, and $R_7$ may each independently be an alkyl group having 1 to 3 carbon atoms, $R_8$ and $R_9$ may each independently be an alkylene group having 1 to 3 carbon atoms, and $R_a$, $R_b$, $R_c$, and $R_d$ may each independently be hydrogen.

More specifically, in Formula 1, $R_1$ may be —$R_1'$—O—, wherein $R_1'$ is an alkylene group having 2 to 5 carbon atoms, $R_2$ may be —O—$R_2'$—, wherein $R_2'$ is an alkylene group having 2 to 5 carbon atoms, $R_4$, $R_5$, $R_6$, and $R_7$ may each independently be an alkyl group having 1 to 3 carbon atoms, $R_8$ and $R_9$ may each independently be an alkylene group having 1 or 2 carbon atoms, and $R_a$, $R_b$, $R_c$, and $R_d$ may each independently be hydrogen.

Also, in Formula 1, R and $R_3$ may be at least one aliphatic hydrocarbon group selected from the group consisting of an alicyclic hydrocarbon group and a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkenylene group having 4 to 20 carbon atoms; and a substituted or unsubstituted heterocycloalkylene group having 2 to 20 carbon atoms, and, among them, the alicyclic hydrocarbon group may be the substituted or unsubstituted cycloalkylene group having 4 to 20 carbon atoms.

The linear hydrocarbon group may include at least one selected from the group consisting of a substituted or unsubstituted alkylene group having 1 to 20 carbon atoms; a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Furthermore, in Formula 1, R and $R_3$ may be an aromatic hydrocarbon group.

The aromatic hydrocarbon group may include at least one selected from the group consisting of a substituted or unsubstituted arylene group having 6 to 20 carbon atoms; and a substituted or unsubstituted heteroarylene group having 4 to 20 carbon atoms.

Specifically, the oligomer represented by Formula 1 may include at least one selected from the group consisting of compounds represented by Formula 1a and Formula 1b below.

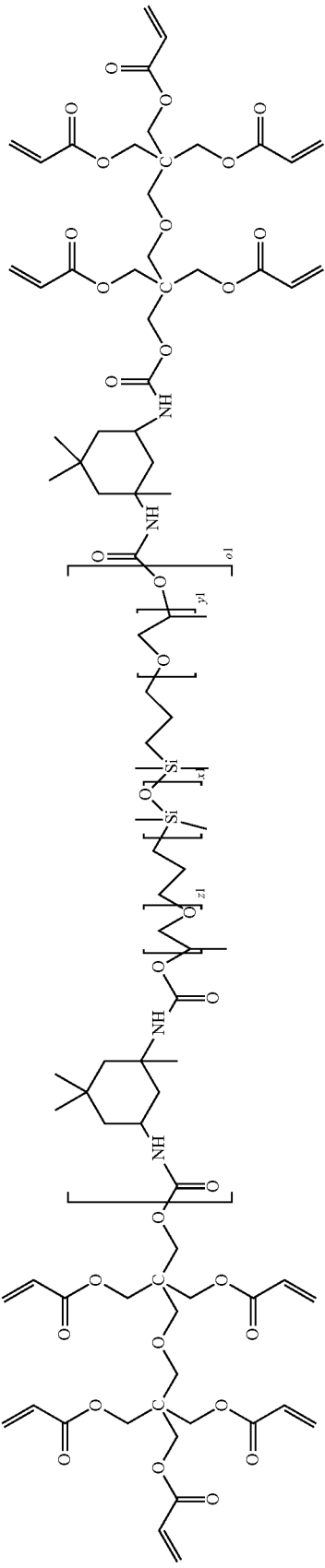
[Formula 1a]

In Formula 1a, x1, y1, z1, and o1 are each independently an integer of 1 to 100.

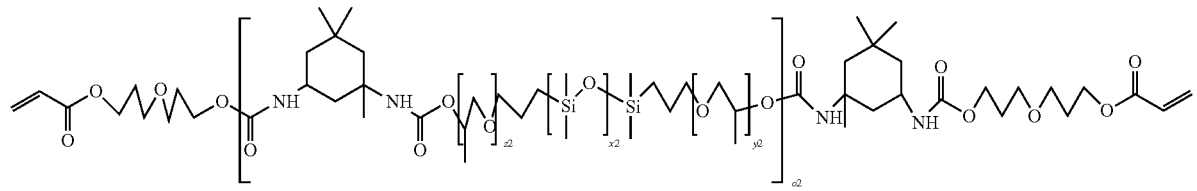

In Formula 1b,

X2, y2, z2, and o2 are each independently an integer of 1 to 100.

Since the oligomer represented by Formula 1 contains a siloxane group (—[Si—O]—) and a urethane group, as a hydrophobic part, as well as an acrylate group as a hydrophilic in its structure, the oligomer represented by Formula 1 may exhibit a balanced affinity for a hydrophilic part (positive electrode, separator (SRS layer)) and a hydrophobic part (negative electrode, separator fabric) to act as a surfactant. Thus, the wetting of the composition for a gel polymer electrolyte may be improved by reducing the surface tension with respect to the electrode and the separator.

With respect to a polymer having a skeleton of alkylene oxide which has been used during the preparation of a conventional gel polymer electrolyte, since reduction stability is low, a film may be formed on a surface of the negative electrode during initial charge. However, since the film is easily broken at high temperature to cause a side reaction, interfacial resistance between the electrode and the gel polymer electrolyte may rather be increased.

In contrast, since the oligomer represented by Formula 1 is electrochemically stable, the oligomer represented by Formula 1 not only has high reduction stability, but also possesses the ability to dissociate the lithium salt, and thus, the oligomer represented by Formula 1 may minimize a reduction reaction on the surface of the negative electrode and may improve lithium ion mobility.

Therefore, the composition for a gel polymer electrolyte of the present invention may prepare a gel polymer electrolyte in which a side reaction with the electrode is reduced, mechanical strength is high, and an effect of stabilizing an interface between the electrode and the electrolyte is improved in comparison to a conventional composition for a gel polymer electrolyte which includes the polymer having the skeleton of alkylene oxide.

A weight-average molecular weight (MW) of the oligomer represented by Formula 1 may be in a range of 1,000 g/mol to 100,000 g/mol, particularly 1,000 g/mol to 50,000 g/mol, and more particularly 1,000 g/mol to 10,000 g/mol, for example, 3,000 g/mol to 7,000 g/mol, and the range thereof may be controlled by the number of repeating units. In a case in which the weight-average molecular weight of the oligomer is within the above range, mechanical strength of the non-aqueous electrolyte solution including the oligomer may be effectively improved.

If the weight-average molecular weight of the oligomer represented by Formula 1 is less than 1,000 g/mol, since adequate mechanical strength may not be expected and the use of a greater amount of a polymerization initiator is required or a demanding additional polymerization process is required, a gel polymer electrolyte formation process may be complicated. If the weight-average molecular weight of the oligomer is greater than 100,000 g/mol, since physical properties of the oligomer itself become rigid and the affinity with the electrolyte solvent is decreased, dissolution is difficult, and thus, the formation of a uniform and excellent gel polymer electrolyte may not be expected.

The weight-average molecular weight may be measured by gel permeation chromatography (GPC) using 1200 series by Agilent Technologies. For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated according to an analytical method (system: Alliance 4, column: Ultrahydrogel linearX2, eluent: 0.1M NaNO$_3$ (pH 7.0 phosphate buffer, flow rate: 0.1 mL/min, solvent: tetrahydrofuran (THF), temp: 40° C., injection: 100 μL).

(4) Compound Represented by Formula 2

The composition for a gel polymer electrolyte of the present invention includes a compound represented by Formula 2, as an ionic monomer having a crosslinking reactive group, to improve a crosslinking effect.

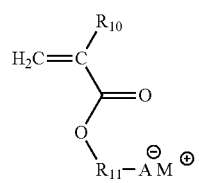

In Formula 2, $R_{10}$ is hydrogen or an alkyl group having 1 to 4 carbon atoms, $R_{11}$ is an alkylene group having 1 to 6 carbon atoms which is unsubstituted or substituted with fluorine, and M is at least one alkali metal ion selected from lithium (Li), sodium (Na), and potassium (K), and A is $SO_3^{\ominus}$, $$SO_2C(CN)_2^{\ominus} \quad \text{or} \quad SO_2NSO_2CF_3^{\ominus}.$$

In Formula 2, $R_{10}$ is hydrogen or an alkyl group having 1 to 3 carbon atoms, $R_{11}$ is an alkylene group having 2 to 5 carbon atoms which is unsubstituted or substituted with fluorine, M is a lithium (Li) ion, and A is $SO_3^{\ominus}$,

or

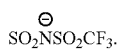

Specifically, the compound represented by Formula 2 may include at least one selected from the group consisting of compounds represented by Formulae 2a to 2c below.

[Formula 2a]

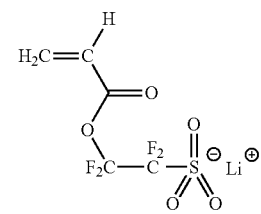

[Formula 2b]

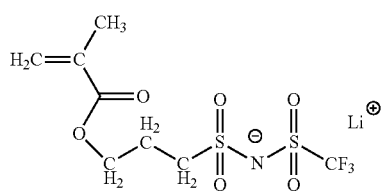

[Formula 2c]

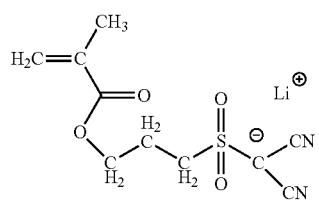

Since the compound represented by Formula 2 includes a double bond (C=C), as a crosslinking reactive group, in its structure, crosslinking with the oligomer represented by Formula 1 is facilitated, and thus, a gel polymer electrolyte having improved mechanical strength may be prepared.

Furthermore, since the compound represented by Formula 2 is an ionic monomer having a single ionic carrier structure containing both anions and alkali metal cations in the structure, ion transfer is possible even if the lithium salt is not additionally supplied. A polymer, which is formed by polymerization of the oligomer represented by Formula 1, acts as a macroanion, and an ion transfer effect may be increased while the alkali metal cations uniformly and efficiently move due to a hopping phenomenon of the alkali metal cations in the polymer. Thus, a gel polymer electrolyte having improved ionic conductivity may be prepared.

The composition for a gel polymer electrolyte of the present invention may include at least one of the compounds of Formulae 2a to 2c, and, specifically, a mixture of two or more of the compounds of Formulae 2a to 2c may be used.

For example, in a case in which a mixture of the compound of Formula 2a and the compound of Formula 2b is used, the compound of Formula 2a and the compound of Formula 2b may be included in a weight ratio of 1:10 to 10:1, for example, 5:5. Also, in a case in which a mixture of the compound of Formula 2b and the compound of Formula 2c is used, the compound of Formula 2b and the compound of Formula 2c may be included in a weight ratio of 1:10 to 10:1, for example, 5:5.

A mixed amount (solid content) of the oligomer represented by Formula 1 and the compound represented by Formula 2 may be in a range of 0.1 wt % to 60 wt %, particularly 1 wt % to 30 wt %, and more particularly 1 wt % to 20 wt % based on a total weight of the composition for a gel polymer electrolyte.

In a case in which the mixed amount (solid content) of the oligomer represented by Formula 1 and the compound represented by Formula 2 satisfies the above range, a gel polymer electrolyte having excellent mechanical strength and ionic conductivity may be prepared. That is, in a case in which the mixed solid content of the oligomer represented by Formula 1 and the compound represented by Formula 2 is 0.1 wt % or more, a gel polymer electrolyte having high ionic conductivity and stable network structure may be prepared. Also, in a case in which the mixed solid content of the oligomer represented by Formula 1 and the compound represented by Formula 2 is 60 wt % or less, wetting of the gel polymer electrolyte may be secured, and, simultaneously, sufficient ionic conductivity may be secured by increasing a lithium ion movement effect.

A weight ratio of the oligomer represented by Formula 1:the compound represented by Formula 2 in the composition for a gel polymer electrolyte may be in a range of 0.2:99.8 to 99.8:0.2, particularly 10:90 to 80:20, and more particularly 40:60 to 80:20.

An amount of the cations (e.g., Li+) in the polymer formed by the polymerization of the oligomer represented by Formula 1 and the compound represented by Formula 2 may vary depending on a weight ratio of the compound represented by Formula 2 to the oligomer represented by Formula 1. That is, a mixing ratio of the oligomer represented by Formula 1 to the compound represented by Formula 2 satisfies the above range, since the amount of the cations is increased, the cations may uniformly move and may be uniformly distributed, and, accordingly, the ionic conductivity of the gel polymer electrolyte may be increased.

In a case in which the weight ratio of the compound represented by Formula 2 to the oligomer represented by Formula 1 is less than 0.2, since an amount of the oligomer represented by Formula 1 and having a high molecular weight is increased, physical strength of the gel polymer electrolyte is increased, but the amount of the cations in the polymer formed by the polymerization of the oligomer represented by Formula 1 and the compound represented by Formula 2 may be decreased to reduce the ion transfer capability of the gel polymer electrolyte.

Thus, in a case in which the weight ratio of the oligomer represented by Formula 1 is 0.2 or more, for example, 10 or more, since a polymer matrix may be easily formed by the oligomer and a polymer network having excellent mechanical strength may be formed, a gel polymer electrolyte having improved overall performance may be prepared. Also, in a case in which the weight ratio of the oligomer represented by Formula 1 is 99.8 or less, for example, 80 or less, it is possible to prevent disadvantages such as an increase in resistance due to the excessive amount of the oligomer added and limitation of movement of lithium ions, for example, a decrease in ionic conductivity, and proper viscosity may be secured to improve the wetting of the composition for a gel polymer electrolyte.

In other words, if an amount of the compound represented by Formula 2 included is within the above range, the transfer of a single cation species is not only possible even if a salt is not added, but also the cations may more efficiently move due to ion transport properties of the macroanion, and thus, a gel polymer electrolyte having improved ionic conductivity may be prepared. Specifically, mobility of lithium ions in the gel polymer electrolyte may be improved, because the amount of the cations may be secured when the weight ratio of the compound represented by Formula 2 is 0.2 or more, for example, 20 or more, and mechanical properties of the gel polymer electrolyte may be secured only when the weight ratio of the compound represented by Formula 2 is 99.8 or less, for example, 80 or less.

(5) Polymerization Initiator

The composition for a gel polymer electrolyte of the present invention may include a polymerization initiator to perform a radical reaction required during the preparation of the gel polymer electrolyte.

A conventional thermal or photopolymerization initiator known in the art may be used as the polymerization initiator. For example, the polymerization initiator forms a radical by being dissociated by heat, and may react with the oligomer represented by Formula 1 by free radical polymerization to form a gel polymer electrolyte.

Specifically, non-limiting examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and one or more azo compounds selected from the group consisting of 2,2'-azobis(2-cyanobutane), 2,2'-azobis(methylbutyronitrile), 2,2'-azobis(iso-butyronitrile) (AIBN), and 2,2'-azobis-dimethyl-valeronitrile (AMVN), but the polymerization initiator is not limited thereto.

The polymerization initiator forms a radical by being dissociated by heat, for a non-limiting example, heat at 30° C. to 100° C. in the battery or by being dissociated at room temperature (5° C. to 30° C.), and the polymerizable oligomer may react with an acrylate-based compound by free radical polymerization to form a gel polymer electrolyte.

The polymerization initiator may be included in an amount of 0.01 part by weight to 20 parts by weight, for example, 0.1 part by weight to 10 parts by weight based on 100 parts by weight of the oligomer represented by Formula 1.

In a case in which the amount of the polymerization initiator is within a range of 0.01 part by weight to 20 parts by weight, gel polymer electrolyte properties may be secured by increasing a gel polymer conversion rate, and the wetting of the composition for a gel polymer electrolyte with respect to the electrode may be improved by preventing a pre-gel reaction.

(6) Oxygen Scavenger

Also, the composition for a gel polymer electrolyte of the present invention may further include an oxygen scavenger as an additive.

In general, when the radical reaction required during the preparation of the gel polymer electrolyte is performed in the presence of oxygen, since chain polymerization efficiency is reduced while the reaction is stabilized due to quenching by the oxygen, it is known that a gel conversion rate of a monomer and/or oligomer is reduced. That is, since the radical generated from the polymerization initiator is consumed by easily reacting with oxygen, radical polymerization reactivity is reduced in the presence of oxygen.

Thus, the composition for a gel polymer electrolyte of the present invention may further include the oxygen scavenger to improve liquid injection characteristics by controlling gelation reactivity at room temperature and in an oxygen atmosphere. The gel polymer electrolyte composition having such a configuration may improve a polymerization effect by reducing the influence of oxygen even when gelation is performed in an oxygen atmosphere.

The oxygen scavenger may include at least one of a trisalkylsilyl phosphite-based compound and a trisarylsilyl phosphite-based compound. That is, since oxygen is scavenged while a phosphite structure is converted into a phosphate structure, the trisalkylsilyl phosphite-based compound or the trisarylsilyl phosphite-based compound included as the oxygen scavenger may prevent the removal of the radical generated from the polymerization initiator by the oxygen.

Typical examples of the trisalkylsilyl phosphite-based compound may be at least one selected from the group consisting of tris-2,2,2-trifluoroethyl phosphite (TFEPi), tris(methylsilyl) phosphite (TMSPi), tris(ethylsilyl) phosphite (TESPi), tris(propylsilyl) phosphite (TPSPi), and tris(butylsilyl) phosphite. Also, the trisarylsilyl phosphite-based compound may include trisphenylsilyl phosphite. In this case, it is desirable to avoid the use of a fluorine-based oxygen scavenger containing a fluorine element as the oxygen scavenger.

Since the composition for a gel polymer electrolyte of the present invention includes the oxygen scavenger, it is advantageous in that a pre-gel reaction does not occur even at room temperature.

The oxygen scavenger may be included in an amount of 0.01 wt % to 10 wt % based on the total weight of the composition for a gel polymer electrolyte. If the amount of the oxygen scavenger included is within a range of 0.01 wt % to 10 wt %, for example, 0.5 wt % to 10 wt %, a gelation phenomenon may be suppressed by reducing a polymerization conversion rate at room temperature and in an oxygen atmosphere. Specifically, in a case in which the amount of the oxygen scavenger is 0.01 wt % or more, since an oxygen removal effect is excellent, the polymerization conversion rate may be increased, and thus, mechanical strength of the gel polymer electrolyte may be improved. Also, in a case in which the amount of the oxygen scavenger is 10 wt % or less, an increase in resistance due to the residual additive may be prevented.

(7) Additional Additives

In order to prevent a gel polymer electrolyte from being decomposed during the preparation of the gel polymer electrolyte to cause collapse of a negative electrode in a high output environment, or further improve low-temperature high-rate discharge characteristics, high-temperature stability, overcharge protection, high-temperature swelling improvement, resistance reduction, lifetime improvement, and gas reduction effect, the composition for a gel polymer electrolyte of the present invention may further include additional additives, if necessary.

Specific examples of the additional additive may be at least one selected from the group consisting of vinylene carbonate (VC), vinyl ethylene carbonate (VEC), ethylene sulfate (Esa), trimethylene sulfate (TMS), methyl trimethylene sulfate (MTMS), 1,3-propane sultone (PS), succinonitrile (SN), adiponitrile (Adn), ethylene sulfite, 1,3-propene sultone (PRS), fluoroethylene carbonate (FEC), lithium difluoro(bisoxalato)phosphate, lithium difluorophosphate, lithium oxalyldifluoroborate, LiBr, LiF, LiI, succinyl anhydride, $CsNO_3$, $In(TFSI)_3$, tris(2,2,2-trifluoroethyl)phosphate (TFEPa), 1,1,2,2-tetrafluoroethyl 2,2,2-trifluoroethyl ether, F3-EMC (2,2,2-trifluoroethyl methyl carbonate), difluoroethyl acetate (di-FEC), fluorobenzene, difluorobenzene, hexafluorobenzene, and $LiBF_4$.

Vinylene carbonate, vinyl ethylene carbonate, or succinonitrile, among these additional additives, may form a stable solid electrolyte interface (SEI) with lithium difluorophosphate on a surface of the negative electrode during an initial activation process of the secondary battery.

The $LiBF_4$ is added to a lithium secondary battery and may improve high-temperature stability of the secondary battery by suppressing the generation of gas which may be generated due to the decomposition of the composition for a gel polymer electrolyte at high temperature.

At least one of the additional additives may be mixed and may be included in an amount of 0.01 wt % to 5 wt %, particularly 0.1 wt % to 3 wt %, and preferably 0.5 wt % to 3 wt % based on the total weight of the composition for a gel polymer electrolyte. If the amount of the additional additive is less than 0.01 wt %, effects of improving low-temperature output, high-temperature storage characteristics, and high-temperature life characteristics of the battery are insignificant, and, if the amount of the additional additive is greater than 5 wt %, there is a possibility that a side reaction in the composition for a gel polymer electrolyte occurs excessively during charge and discharge of the battery. Particularly, since the additives for forming an SEI may not be sufficiently decomposed at high temperatures when excessive amounts of the additives for forming an SEI are added, the additives for forming an SEI may be present in the form of an unreacted material or precipitates in the composition for a gel polymer electrolyte at room temperature. Accordingly, a side reaction may occur in which life or resistance characteristics of the secondary battery are degraded.

Gel Polymer Electrolyte

Also, in the present invention, a gel polymer electrolyte formed by polymerization of the composition for a gel polymer electrolyte is provided.

A conventional polymerization method may be used as a polymerization method for preparing the gel polymer electrolyte of the present invention without limitation.

For example, i) after preparing a composition for a gel polymer electrolyte which includes a lithium salt, an organic solvent, a polymerization initiator, the oligomer represented by Formula 1, and the compound represented by Formula 2, a gel polymer electrolyte including a polymer matrix may be prepared by injecting the composition into a battery and performing a thermal polymerization reaction.

Also, ii) after forming a polymer matrix by performing a polymerization reaction between the oligomer represented by Formula 1 and the compound represented by Formula 2 in the presence of a polymerization initiator in an electrochemical device, a gel polymer electrolyte may be prepared by further impregnation with a non-aqueous electrolyte solution including a lithium salt and an organic solvent.

In this case, the polymerization reaction may be performed through a heating, electron beam (e-beam), or γ-ray process, and, specifically, a thermal polymerization method is preferable in which heating is performed in a temperature range of 50° C. to 100° C. for about 1 hour to about 8 hours.

The radical polymerization for the gelation may be performed under an inert condition in which oxygen, as a radical scavenger, in the atmosphere is blocked. Also, in a case in which the oxygen scavenger is further included in the gel polymer electrolyte composition of the present invention, the polymerization reaction for preparing the gel polymer electrolyte may be performed in the presence of normal air or oxygen. That is, since the oxygen scavenger included in the gel polymer electrolyte improves reactivity of the oligomers by reducing the influence of the oxygen during the polymerization reaction, an extent of reaction may be increased to such a degree that a large amount of unreacted monomer is almost not present even in a normal air or oxygen atmosphere. As a result, disadvantages, such as charge and discharge performance degradation that occurs while the unreacted monomer typically remains in the battery, may be improved. Particularly, the oxygen scavenger may further provide a flame retardant strengthening effect of the gel polymer electrolyte by containing a flame retardant functional group.

Lithium Secondary Battery

Furthermore, in an embodiment of the present invention, a lithium secondary battery including the gel polymer electrolyte of the present invention may be provided.

The lithium secondary battery of the present invention may be prepared by injecting the composition for a gel polymer electrolyte of the present invention into an electrode assembly formed by sequentially stacking a positive electrode, a negative electrode, and a separator selectively disposed between the positive electrode and the negative electrode and then curing the composition for a gel polymer electrolyte.

In this case, those prepared by typical methods during the preparation of a lithium secondary battery may be used as the positive electrode, negative electrode, and separator which constitute the electrode assembly.

(1) Positive Electrode

The positive electrode may be prepared by forming a positive electrode material mixture layer on a positive electrode collector. The positive electrode material mixture layer may be prepared by coating the positive electrode collector with a positive electrode active material slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), etc.), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}CO_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be included in an amount of 80 wt % to 99 wt % based on a total weight of solid content in the positive electrode active material slurry.

The binder is a component that assists in the binding between the active material and the conductive agent and in the binding with the current collector, wherein the binder is commonly added in an amount of 1 wt % to 30 wt % based on the total weight of the solid content in the positive electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene termonomer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode active material slurry.

The conductive agent is not particularly limited as long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 50 wt % to 95 wt %, for example, 70 wt % to 90 wt %.

(2) Negative Electrode

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0<x\leq 1$; $1\leq y\leq 3$; $1\leq z\leq 8$) may be used as the metal composite oxide.

The material, which may be doped and undoped with lithium, may include Si, $SiO_x$ ($0<x\leq 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. One, which is the same as or different from the conductive agent used during the preparation of the positive electrode, may be used as the conductive agent, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content including the negative electrode active material as well as selectively the binder and the conductive agent is in a range of 50 wt % to 95 wt %, for example, 70 wt % to 90 wt %.

(3) Separator

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Preparation of Composition for Gel Polymer Electrolyte)

An organic solvent was prepared by dissolving LiFSI in dimethyl carbonate (DMC) to have a concentration of 4.5 M. Thereafter, a composition for a gel polymer electrolyte was prepared by adding 4 g of the oligomer represented by Formula 1a (weight-average molecular weight (Mw) 6,000, z1=10, x1=10, y1=5, o1=2), 1 g of the compound represented by Formula 2a, and 0.01 g of AIBN, as a polymerization initiator, to 94.99 g of the organic solvent (see Table 1 below).

(Secondary Battery Preparation)

A positive electrode active material (LiNi$_{1/3}$Co$_{1/3}$Mn$_{1/3}$O$_2$; NCM), a conductive agent (carbon black), and a binder (polyvinylidene fluoride; PVDF) were added in a weight ratio of 94:3:3 to N-methyl-2-pyrrolidone (NMP), as a solvent, to prepare a positive electrode active material slurry. An about 20 μm thick aluminum (Al) thin film, as a positive electrode collector, was coated with the positive electrode active material slurry and dried, and the coated Al thin film was then roll-pressed to prepare a positive electrode.

A negative electrode active material (carbon powder), a conductive agent (carbon black), and a binder (polyvinylidene fluoride; PVDF) were added in a weight ratio of 96:1:3 to NMP, as a solvent, to prepare a negative electrode active material slurry (solid content concentration 60 wt %). A 10 μm thick negative electrode collector (copper (Cu) thin film) was coated with the negative electrode active material slurry and dried, and the coated Cu thin film was then roll-pressed to prepare a negative electrode.

After an electrode assembly was prepared by sequentially stacking the positive electrode, a separator formed of three layers of polypropylene/polyethylene/polypropylene (PP/PE/PP), and the negative electrode, the assembled electrode assembly was accommodated in a battery case, the composition for a gel polymer electrolyte was injected thereinto, and aging was then performed for 2 days. Thereafter, curing was performed at 70° C. for 5 hours to prepare a lithium secondary battery including a thermally polymerized gel polymer electrolyte.

Example 2

A composition for a gel polymer electrolyte and a lithium secondary battery including a gel polymer electrolyte formed therefrom were prepared in the same manner as in Example 1 except that 1 g of the oligomer represented by Formula 1a (weight-average molecular weight (Mw) 6,000, z1=10, x1=10, y1=5, o1=2) and 4 g of the compound represented by Formula 2a were added to 94.99 g of an organic solvent during the preparation of the composition for a gel polymer electrolyte.

Example 3

A composition for a gel polymer electrolyte and a lithium secondary battery including a gel polymer electrolyte formed therefrom were prepared in the same manner as in Example 1 except that 4.95 g of the oligomer represented by Formula 1a (weight-average molecular weight (Mw) 6,000, z1=10, x1=10, y1=5, o1=2) and 0.05 g of the compound represented by Formula 2a were added to 94.99 g of an organic solvent during the preparation of the composition for a gel polymer electrolyte.

Example 4

A composition for a gel polymer electrolyte and a lithium secondary battery including a gel polymer electrolyte formed therefrom were prepared in the same manner as in Example 1 except that 0.05 g of the oligomer represented by Formula 1a (weight-average molecular weight (Mw) 6,000, z1=10, x1=10, y1=5, o1=2) and 4.95 g of the compound represented by Formula 2a were added to 94.99 g of an organic solvent during the preparation of the composition for a gel polymer electrolyte.

Example 5

A composition for a gel polymer electrolyte and a lithium secondary battery including a gel polymer electrolyte formed therefrom were prepared in the same manner as in Example 1 except that 3 g of the oligomer represented by Formula 1a (weight-average molecular weight (Mw) 6,000, z1=10, x1=10, y1=5, o1=2), 2 g of the compound represented by Formula 2c, and 1 g of tris-2,2,2-trifluoroethyl phosphite (TFEPi), as an oxygen scavenger, were added to 93.99 g of an organic solvent during the preparation of the composition for a gel polymer electrolyte.

Example 6

A composition for a gel polymer electrolyte and a lithium secondary battery including a gel polymer electrolyte formed therefrom were prepared in the same manner as in Example 1 except that 3 g of the oligomer represented by Formula 1a (weight-average molecular weight (Mw) 6,000, z1=10, x1=10, y1=5, o1=2), 1 g of the compound represented by Formula 2b, 1 g of the compound represented by Formula 2c, and 1 g of tris-2,2,2-trifluoroethyl phosphite (TFEPi), as an oxygen scavenger, were added to 93.99 g of an organic solvent during the preparation of the composition for a gel polymer electrolyte.

Example 7

A composition for a gel polymer electrolyte and a lithium secondary battery including a gel polymer electrolyte formed therefrom were prepared in the same manner as in Example 1 except that the oligomer represented by Formula 1b (weight-average molecular weight (Mw) 5,300, z1=10, x1=10, y1=5, o1=2) was included instead of the oligomer represented by Formula 1a during the preparation of the composition for a gel polymer electrolyte.

Example 8

A composition for a gel polymer electrolyte and a lithium secondary battery including a gel polymer electrolyte formed therefrom were prepared in the same manner as in Example 1 except that 3 g of the oligomer represented by Formula 1a (weight-average molecular weight (Mw) 6,000, z1=10, x1=10, y1=5, o1=2), 2 g of the compound represented by Formula 2b, and 1 g of tris-2,2,2-trifluoroethyl phosphite (TFEPi), as an oxygen scavenger, were added to 93.99 g of an organic solvent during the preparation of the composition for a gel polymer electrolyte.

Example 9

A composition for a gel polymer electrolyte was prepared in the same manner as in Example 1 except that 3 g of the oligomer represented by Formula 1a (weight-average molecular weight (Mw) 6,000, z1=10, x1=10, y1=5, o1=2), 2 g of the compound represented by Formula 2b, 11 g of tris-2,2,2-trifluoroethyl phosphite (TFEPi), as an oxygen scavenger, and 0.01 g of a polymerization initiator were added to 83.99 g of an organic solvent during the preparation of the composition for a gel polymer electrolyte.

Comparative Example 1

A composition for a gel polymer electrolyte and a lithium secondary battery including a gel polymer electrolyte formed therefrom were prepared in the same manner as in Example 1 except that 5 g of the oligomer represented by Formula 1a (weight-average molecular weight (Mw) 6,000, z1=10, x1=10, y1=5, o1=2) and 0.01 g of a polymerization initiator were added to 94.99 g of an organic solvent during the preparation of the composition for a gel polymer electrolyte.

Comparative Example 2

A composition for a gel polymer electrolyte and a lithium secondary battery including a gel polymer electrolyte formed therefrom were prepared in the same manner as in Example 1 except that 5 g of the compound represented by Formula 2a, 1 g of tris-2,2,2-trifluoroethyl phosphite (TFEPi), as an oxygen scavenger, and 0.01 g of a polymerization initiator were added to 93.99 g of an organic solvent during the preparation of the composition for a gel polymer electrolyte.

Comparative Example 3

(Non-Aqueous Electrolyte Solution Preparation)
A non-aqueous electrolyte solution was prepared by dissolving LiFSI in dimethyl carbonate (DMC) to have a concentration of 4.5 M.

(Secondary Battery Preparation)
A positive electrode active material (LiNi$_{1/3}$Co$_{1/3}$Mn$_{1/3}$O$_2$; NCM), a conductive agent (carbon black), and a binder (polyvinylidene fluoride; PVDF) were added in a weight ratio of 94:3:3 to N-methyl-2-pyrrolidone (NMP), as a solvent, to prepare a positive electrode active material slurry. An about 20 μm thick aluminum (Al) thin film, as a positive electrode collector, was coated with the positive electrode active material slurry and dried, and the coated Al thin film was then roll-pressed to prepare a positive electrode.

A negative electrode active material (carbon powder), a conductive agent (carbon black), and a binder (polyvinylidene fluoride; PVDF) were added in a weight ratio of 96:1:3 to NMP, as a solvent, to prepare a negative electrode active material slurry (solid content concentration 60 wt %). A 10 μm thick negative electrode collector (copper (Cu) thin film) was coated with the negative electrode active material slurry and dried, and the coated Cu thin film was then roll-pressed to prepare a negative electrode.

After an electrode assembly was prepared by sequentially stacking the positive electrode, a separator formed of three layers of polypropylene/polyethylene/polypropylene (PP/PE/PP), and the negative electrode, the assembled electrode assembly was accommodated in a battery case, the non-aqueous electrolyte solution was injected thereinto, and aging was then performed for 2 days to prepare a lithium secondary battery.

Comparative Example 4

A composition for a gel polymer electrolyte and a lithium secondary battery including a gel polymer electrolyte formed therefrom were prepared in the same manner as in Example 1 except that 4.995 g of the oligomer represented by Formula 1a (weight-average molecular weight (Mw) 6,000, z1=10, x1=10, y1=5, o1=2), 0.005 g of the compound represented by Formula 2a, and 0.01 g of a polymerization initiator were added to 94.99 g of an organic solvent during the preparation of the composition for a gel polymer electrolyte.

Comparative Example 5

A composition for a gel polymer electrolyte and a lithium secondary battery including a gel polymer electrolyte formed therefrom were prepared in the same manner as in Example 1 except that 0.005 g of the oligomer represented by Formula 1a (weight-average molecular weight (Mw) 6,000, z1=10, x1=10, y1=5, o1=2), 4.995 g of the compound represented by Formula 2a, and 0.01 g of a polymerization initiator were added to 94.99 g of an organic solvent during the preparation of the composition for a gel polymer electrolyte.

EXPERIMENTAL EXAMPLES

Experimental Example 1: Oxidation Stability Evaluation Method

Electrochemical (oxidation) stabilities of the secondary batteries prepared in Examples 1 to 8 and the secondary batteries prepared in Comparative Examples 1 to 5 were measured using linear sweep voltammetry (LSV). A potentiostat (EG&G, model 270A) was used as a measuring device, and measurement temperature was 60° C. The results thereof are presented in Table 2 below.

TABLE 2

|  | Oxidation stability (V) @60° C. |
|---|---|
| Example 1 | 4.84 |
| Example 2 | 4.86 |
| Example 3 | 4.72 |
| Example 4 | 4.76 |
| Example 5 | 4.95 |
| Example 6 | 4.87 |
| Example 7 | 4.70 |
| Example 8 | 4.91 |
| Comparative Example 1 | 4.60 |
| Comparative Example 2 | 4.67 |
| Comparative Example 3 | 4.50 |
| Comparative Example 4 | 4.60 |
| Comparative Example 5 | 4.66 |

Referring to Table 2, since the secondary batteries prepared in Examples 1 to 8 of the present invention had an oxidation initiation voltage of about 4.70 V or more, it was confirmed that the secondary batteries prepared in Examples 1 to 8 exhibited excellent electrochemical (oxidation) stabilities.

In contrast, with respect to the secondary batteries of Comparative Examples 1 to 5, it may be understood that oxidation initiation voltages were less than about 4.67 V, which was lower than those of the secondary batteries of Examples 1 to 8.

TABLE 1

|  | Organic solvent amount (g) | Oligomer represented by Formula 1 | | Compound represented by Formula 2 | | Weight ratio of the oligomer of Formula 1:the compound of Formula 2 | Oxygen scavenger amount (g) | Polymerization initiator amount (g) |
|---|---|---|---|---|---|---|---|---|
|  |  | Formula | Amount (g) | Formula | Amount (g) |  |  |  |
| Example 1 | 94.99 | 1a | 4 | 2a | 1 | 80:20 | — | 0.01 |
| Example 2 | 94.99 | 1a | 1 | 2a | 4 | 20:80 | — | 0.01 |
| Example 3 | 94.99 | 1a | 4.95 | 2a | 0.05 | 99:1 | — | 0.01 |
| Example 4 | 94.99 | 1a | 0.05 | 2a | 4.95 | 1:99 | — | 0.01 |
| Example 5 | 93.99 | 1a | 3 | 2c | 2 | 60:40 | 1 | 0.01 |
| Example 6 | 93.99 | 1a | 3 | 2b | 1 | 60:40 | 1 | 0.01 |
|  |  |  |  | 2c | 1 |  |  |  |
| Example 7 | 94.99 | 1b | 4 | 2a | 1 | 80:20 | — | 0.01 |
| Example 8 | 93.99 | 1a | 3 | 2b | 2 | 60:40 | 1 | 0.01 |
| Example 9 | 83.99 | 1a | 3 | 2b | 2 | 60:40 | 11 | 0.01 |
| Comparative Example 1 | 94.99 | 1a | 5 | — | — | 100:0 | — | 0.01 |
| Comparative Example 2 | 93.99 | — | — | 2a | 5 | 0:100 | 1 | 0.01 |
| Comparative Example 3 | 100 | — | — | — | — | — | — | — |
| Comparative Example 4 | 94.99 | 1a | 4.995 | 2a | 0.005 | 99.9:0.1 | — | 0.01 |
| Comparative Example 5 | 94.99 | 1a | 0.005 | 2a | 4.995 | 0.1:99.9 | — | 0.01 |

From these results, it may be confirmed that the oxidation stabilities of the secondary batteries of Examples 1 to 8 including the polymer electrolyte of the present invention were improved in comparison to those of the secondary batteries of Comparative Examples 1 to 5.

Experimental Example 2. Tensile Strength Evaluation Method

Specimens were prepared by using the compositions for a gel polymer electrolyte of Examples 1 to 8 and the compositions for a gel polymer electrolyte of Comparative Examples 1, 2, 4 and 5, and tensile strengths of these specimens were then measured.

The specimens were collectively prepared according to ASTM standard D638 (Type V specimens), and the tensile strength was measured at a rate of 5 mm per minute at 25° C. and a relative humidity of about 30% using Lloyd LR-10K. The results thereof are presented in Table 3 below.

TABLE 3

| | Tensile strength (MPa) |
|---|---|
| Example 1 | 3.87 |
| Example 2 | 4.12 |
| Example 3 | 3.35 |
| Example 4 | 3.51 |
| Example 5 | 5.60 |
| Example 6 | 4.63 |
| Example 7 | 2.54 |
| Example 8 | 4.80 |
| Comparative Example 1 | 1.96 |
| Comparative Example 2 | 1.02 |
| Comparative Example 4 | 1.96 |
| Comparative Example 5 | 1.0 |

Referring to Table 3, it may be confirmed that the tensile strengths of the gel polymer electrolyte specimens prepared in Comparative Examples 1, 2, 4 and 5 were mostly 2 MPa or less, but the tensile strengths of the gel polymer electrolyte specimens prepared in Examples 1 to 8 were 2.54 MPa or more.

Thus, it may be understood that mechanical strengths of the gel polymer electrolytes prepared in Examples 1 to 8 of the present invention were improved.

Experimental Example 3. Ionic Conductivity Evaluation Method

Specimens were prepared by using the compositions for a gel polymer electrolyte of Examples 1 to 9 and the compositions for a gel polymer electrolyte of Comparative Examples 1, 2, 4 and 5. The specimens were collectively prepared according to ASTM standard D638 (Type V specimens).

Subsequently, a circular gold (Au) electrode having a diameter of 1 mm was coated on the specimens using a sputtering method, and ionic conductivity was measured at 25° C. by using an alternating current impedance method. The ionic conductivity was measured in a frequency range of 0.1 Hz to 100 MHz using a VMP3 measurement instrument and a precision impedance analyzer (4294A). The measurement results are presented in Table 4 below.

TABLE 4

| | Ionic conductivity (mS/cm) |
|---|---|
| Example 1 | 1.681 |
| Example 2 | 1.726 |
| Example 3 | 1.611 |
| Example 4 | 1.794 |
| Example 5 | 1.939 |
| Example 6 | 1.930 |
| Example 7 | 1.861 |
| Example 8 | 1.928 |
| Example 9 | 1.582 |
| Comparative Example 1 | 1.420 |
| Comparative Example 2 | 1.534 |
| Comparative Example 4 | 1.443 |
| Comparative Example 5 | 1.526 |

Referring to Table 4, ionic conductivities of the gel polymer electrolytes prepared in Examples 1 to 9 were 1.582 mS/cm or more, but ionic conductivities of the gel polymer electrolytes prepared in Comparative Examples 1, 2, 4 and 5 were mostly 1.534 mS/cm or less, wherein it may be understood that the ionic conductivities were inferior to those of the gel polymer electrolytes prepared in Examples 1 to 9.

It may be understood that the ionic conductivity of the gel polymer electrolyte of Example 9, in which the excessive amount of the oxygen scavenger was included in comparison to the gel polymer electrolytes of Examples 1 to 8, was relatively reduced.

The above descriptions are merely exemplary embodiments for preparing the gel polymer electrolyte according to the present invention and the secondary battery including the same, so that the present invention is not limited thereto. The true scope of the present invention should be defined to the extent that those skilled in the art can make various modifications and changes thereto without departing from the scope of the invention, as defined by the appended claims.

The invention claimed is:

1. A composition for a gel polymer electrolyte, the composition comprising:
a lithium salt,
an organic solvent,
an oligomer represented by Formula 1,
a compound represented by Formula 2, and
a polymerization initiator:

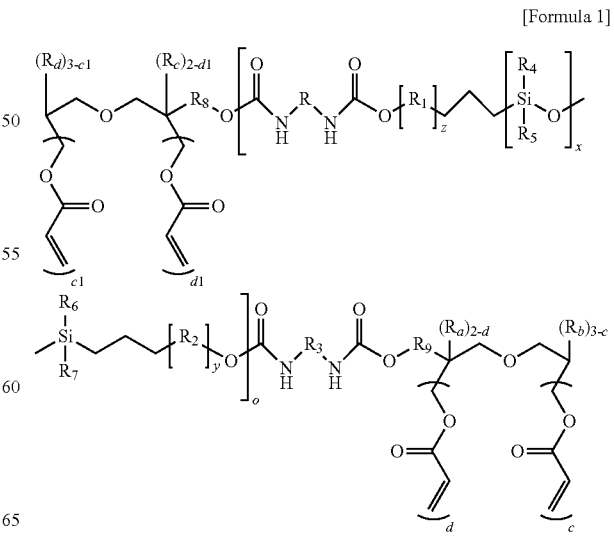

[Formula 1]

wherein, in Formula 1, $R_1$ is an alkylene group having 1 to 5 carbon atoms or —$R_1'$—O—, wherein $R_1'$ is an alkylene group having 1 to 5 carbon atoms, $R_2$ is an alkylene group having 1 to 5 carbon atoms or —O—$R_2'$—, wherein $R_2'$ is an alkylene group having 1 to 5 carbon atoms, $R_4$, $R_5$, $R_6$, and $R_7$ are each independently hydrogen or an alkyl group having 1 to 3 carbon atoms, R and $R_3$ are each independently an aliphatic hydrocarbon group or an aromatic hydrocarbon group, each of $R_8$ and $R_9$ is an alkylene group having 1 to 5 carbon atoms, $R_a$, $R_b$, $R_c$, and $R_d$ are each independently hydrogen or an alkyl group having 1 to 3 carbon atoms, x, y, z, and o are each independently an integer of 1 to 100, c and c1 are each independently an integer of 1 to 3, and d and d1 are each independently an integer of 0 to 2,

[Formula 2]

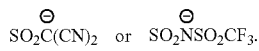

wherein, in Formula 2, $R_{10}$ is hydrogen or an alkyl group having 1 to 4 carbon atoms, $R_{11}$ is an alkylene group having 1 to 6 carbon atoms which is unsubstituted or substituted with fluorine, and M is at least one alkali metal ion selected from lithium (Li), sodium (Na), or potassium (K), and A is $SO_3^{\ominus}$, $$SO_2C(CN)_2^{\ominus} \quad \text{or} \quad SO_2NSO_2CF_3^{\ominus}.$$

2. The composition for a gel polymer electrolyte of claim 1, wherein, in Formula 1, $R_1$ is —$R_1'$—O—, wherein $R_1'$ is an alkylene group having 1 to 5 carbon atoms, $R_2$ is wherein $R_2'$ is an alkylene group having 1 to 5 carbon atoms, $R_4$, $R_5$, $R_6$, and $R_7$ are each independently an alkyl group having 1 to 3 carbon atoms, $R_8$ and $R_9$ are each independently an alkylene group having 1 to 3 carbon atoms, and $R_a$, $R_b$, $R_c$, and $R_d$ are each independently hydrogen.

3. The composition for a gel polymer electrolyte of claim 1, wherein, in Formula 1, $R_1$ is —$R_1'$—O—, wherein $R_1'$ is an alkylene group having 2 to 5 carbon atoms, $R_2$ is —O—$R_2'$—, wherein $R_2'$ is an alkylene group having 2 to 5 carbon atoms, $R_4$, $R_5$, $R_6$, and $R_7$ are each independently an alkyl group having 1 to 3 carbon atoms, $R_8$ and $R_9$ are each independently an alkylene group having 1 or 2 carbon atoms, and $R_a$, $R_b$, $R_c$, and $R_d$ are hydrogen.

4. The composition for a gel polymer electrolyte of claim 1, wherein the oligomer represented by Formula 1 comprises at least one selected from the group consisting of compounds represented by Formula 1a and Formula 1b,

[Formula 1a]

wherein, in Formula 1a, x1, y1, z1, and o1 are each independently an integer of 1 to 100,

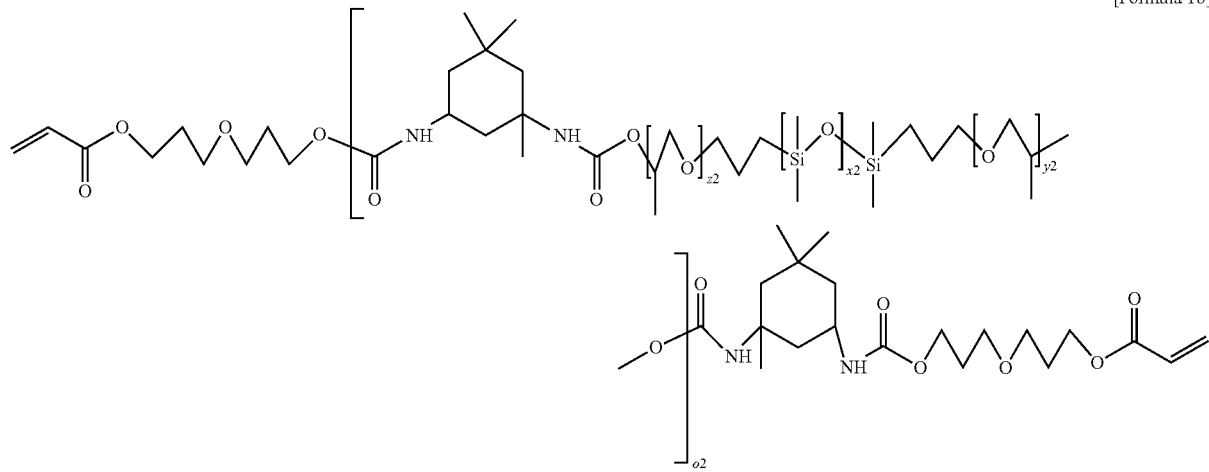

[Formula 1b]

wherein, in Formula 1b,
x2, y2, z2, and o2 are each independently an integer of 1 to 100.

5. The composition for a gel polymer electrolyte of claim 1, wherein, in the compound represented by Formula 2, an alkali metal cation comprises at least one selected from the group consisting of $Li^+$, $Na^+$, and $K^+$.

6. The composition for a gel polymer electrolyte of claim 1, wherein the compound represented by Formula 2 comprises at least one selected from the group consisting of compounds represented by Formulae 2a to 2c:

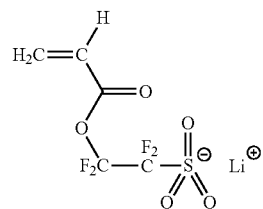

[Formula 2a]

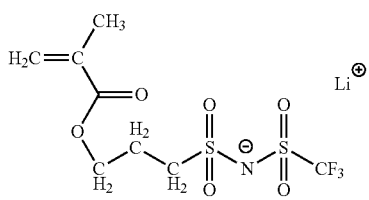

[Formula 2b]

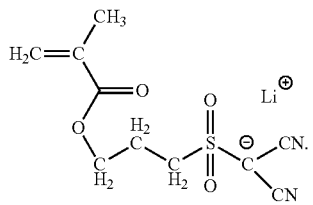

[Formula 2c]

7. The composition for a gel polymer electrolyte of claim 1, wherein a weight ratio of the oligomer represented by Formula 1:the compound represented by Formula 2 is in a range of 0.2:99.8 to 99.8:0.2.

8. The composition for a gel polymer electrolyte of claim 7, wherein the weight ratio of the oligomer represented by Formula 1:the compound represented by Formula 2 is in a range of 10:90 to 80:20.

9. The composition for a gel polymer electrolyte of claim 1, further comprising an oxygen scavenger.

10. The composition for a gel polymer electrolyte of claim 9, wherein the oxygen scavenger is included in an amount of 0.01 wt % to 10 wt % based on a total weight of the composition for a gel polymer electrolyte.

11. A gel polymer electrolyte formed by a thermal polymerization of the composition for a gel polymer electrolyte of claim 1.

12. A lithium secondary battery comprising the gel polymer electrolyte of claim 11.

* * * * *